United States Patent
Becker

(10) Patent No.: US 10,272,628 B2
(45) Date of Patent: Apr. 30, 2019

(54) METHOD FOR PRODUCING A PNEUMATIC VEHICLE TIRE

(71) Applicant: Continental Reifen Deutschland GmbH, Hannover (DE)

(72) Inventor: Theresia Becker, Duesseldorf (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 13/967,196

(22) Filed: Aug. 14, 2013

(65) Prior Publication Data

US 2013/0327467 A1 Dec. 12, 2013

Related U.S. Application Data

(63) Continuation of application No. PCT/EP2011/072523, filed on Dec. 13, 2011.

(30) Foreign Application Priority Data

Feb. 14, 2011 (DE) .................. 10 2011 000 703

(51) Int. Cl.
  *B29D 30/20* (2006.01)
  *B29D 30/22* (2006.01)
  (Continued)

(52) U.S. Cl.
  CPC .......... *B29D 30/20* (2013.01); *B29D 30/22* (2013.01); *B29D 30/70* (2013.01); *B60C 9/28* (2013.01)

(58) Field of Classification Search
  CPC ............... B29D 30/0601; B29D 30/70; B29D 2030/381; B29D 30/20; B29D 30/22;
  (Continued)

(56) References Cited

U.S. PATENT DOCUMENTS

| | | | | |
|---|---|---|---|---|
| 1,657,829 | A | * | 1/1928 | Hopson ............... B29C 70/06 152/556 |
| 2,982,328 | A | * | 5/1961 | Emanueli ............... B60C 9/20 152/527 |

(Continued)

FOREIGN PATENT DOCUMENTS

| | | | | |
|---|---|---|---|---|
| CA | 1151022 | * | 8/1983 | ............... B29H 9/08 |
| DE | 2417105 | * | 1/1975 | ............... B60C 9/02 |

(Continued)

OTHER PUBLICATIONS

Machine generated English language translation of JP 2009-292425 (priginal document dated Dec. 2009).*

(Continued)

*Primary Examiner* — Robert C Dye
*Assistant Examiner* — Sedef E Paquette
(74) *Attorney, Agent, or Firm* — Walter Ottesen, P.A.

(57) ABSTRACT

A method for making a vehicle tire wherein the vehicle tire includes a belt having at least one belt layer made of parallel steel cords embedded in rubber. The belt ply is built up on a building drum in order to produce a tire blank. Upon completion of the tire blank, the tire blank is shaped and vulcanized in a vulcanizing press. The method includes applying the belt ply made of parallel, extensible steel cords embedded in rubber to a building drum to build up the belt. After the tire blank is completed, the tire blank is shaped and vulcanized in a vulcanizing press to reduce the extensibility of the steel cords.

1 Claim, 7 Drawing Sheets

(51) Int. Cl.
*B29D 30/70* (2006.01)
*B60C 9/28* (2006.01)

(58) Field of Classification Search
CPC . B60C 9/0007; B60C 9/22; B60C 2009/0071;
B60C 2009/0078; B60C 2009/2012;
B60C 2009/2074; B60C 2009/208; B60C
2009/2252; B60C 2009/2261; B60C 9/28
USPC .................................................. 156/124
See application file for complete search history.

(56) References Cited

U.S. PATENT DOCUMENTS

| | | | | |
|---|---|---|---|---|
| 3,455,100 | A * | 7/1969 | Sidles | B60C 9/0042 152/556 |
| 3,682,222 | A * | 8/1972 | Alderfer | 152/532 |
| 3,730,246 | A * | 5/1973 | Sidles | B29D 30/22 152/527 |
| 3,734,655 | A * | 5/1973 | Cantarutti | 425/33 |
| 3,786,851 | A * | 1/1974 | Mirtain | B60C 9/20 152/527 |
| 4,121,642 | A * | 10/1978 | Schwartz | 152/452 |
| 4,688,615 | A * | 8/1987 | Lee | B60C 9/2009 152/531 |
| 4,749,016 | A * | 6/1988 | Kojima et al. | 152/527 |
| 4,769,104 | A * | 9/1988 | Okuyama | B29D 30/3007 156/406.4 |
| 4,779,206 | A * | 10/1988 | Mattson | B29C 35/0294 264/40.1 |
| 4,846,907 | A * | 7/1989 | Kumagai et al. | 156/130 |
| 4,947,638 | A * | 8/1990 | Nagamine | B60C 9/0007 152/451 |
| 4,962,803 | A * | 10/1990 | Welter | B60C 9/09 152/510 |
| 5,720,837 | A * | 2/1998 | Regterschot | B29D 30/3007 156/123 |
| 5,738,740 | A * | 4/1998 | Cluzel | 152/527 |
| 5,746,853 | A * | 5/1998 | Burlacot | 152/531 |
| 7,476,285 | B2 | 1/2009 | Ikehara et al. | |
| 2002/0046792 | A1* | 4/2002 | Durif | 152/151 |
| 2003/0075255 | A1* | 4/2003 | Besson | B60C 9/0007 152/554 |
| 2003/0141629 | A1* | 7/2003 | Girard | B29D 30/0629 264/326 |
| 2006/0042733 | A1* | 3/2006 | Matsui | B29D 30/3028 152/152.1 |
| 2006/0249237 | A1* | 11/2006 | Yoshikawa | B60C 15/0027 152/547 |
| 2009/0095396 | A1 | 4/2009 | Harikae | |
| 2009/0272477 | A1* | 11/2009 | Coue | B60C 9/2006 152/526 |
| 2010/0154963 | A1* | 6/2010 | Georges | B60C 9/263 152/532 |

FOREIGN PATENT DOCUMENTS

| | | | | |
|---|---|---|---|---|
| GB | 1100686 | * | 10/1964 | D07B 1/06 |
| JP | 06-45192 | * | 6/1994 | B29D 30/30 |
| JP | 2006-283198 | * | 10/2006 | D07B 1/06 |
| JP | 2009-292425 | * | 12/2009 | B60C 9/20 |
| JP | 2011-16337 A | | 1/2011 | |

OTHER PUBLICATIONS

Machine generated English language translation of DE 2417105 (original document dated Oct. 1975).*
Machine generated English language translation of JP 06-45192 (original document dated Jun. 1994).*
Machine generated English language translation of JP 2006-283198 (original document dated Oct. 2006) (Year: 2006).*
International Search Report dated Mar. 13, 2012 of international application PCT/EP2011/072523 on which this application is based.

* cited by examiner

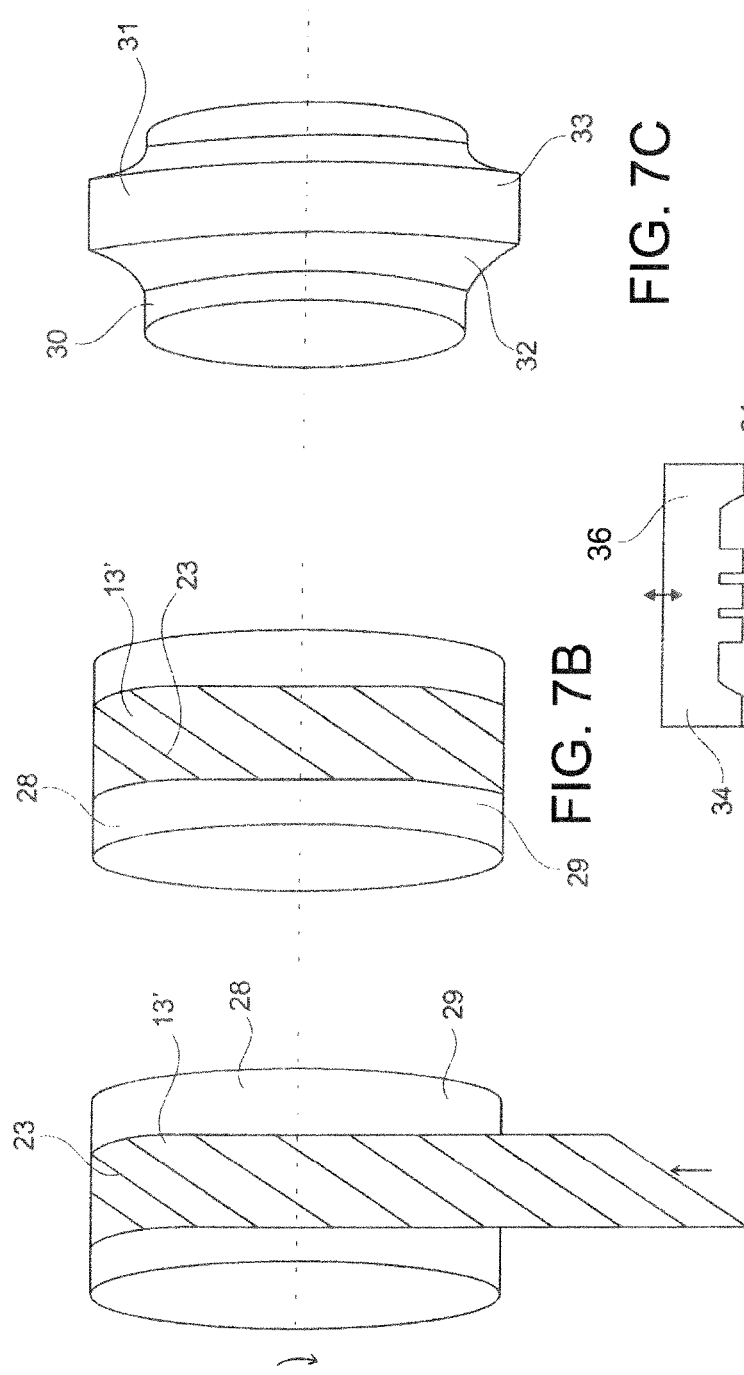

METHOD FOR PRODUCING A PNEUMATIC VEHICLE TIRE

CROSS REFERENCE TO RELATED APPLICATIONS

This application is a continuation application of international patent application PCT/EP2011/072523, filed Dec. 13, 2011, designating the United States and claiming priority from German application 10 2011 000 703.2, filed Feb. 14, 2011, and the entire content of both applications is incorporated herein by reference.

FIELD OF THE INVENTION

The invention relates to a method for producing a pneumatic vehicle tire with a belt, in which at least one belt ply is formed by parallel steel cords embedded in rubber, wherein the belt ply is built up on a building drum in order to produce the tire blank, wherein, after the completion of the tire blank, the tire blank undergoes final shaping and vulcanizing in a vulcanizing press.

BACKGROUND OF THE INVENTION

Pneumatic vehicle tires for commercial vehicles in which the belt is formed by four belt plies arranged one on top of the other in the radial direction, of which two belt plies are designed as working plies, the reinforcements of which are each aligned so as to enclose an angle of 15° to 24° with the circumferential direction of the vehicle tire, are known. In this case, the reinforcements of one working ply have an opposite axial direction of inclination to the reinforcements of the other working ply. The two working plies thereby form a cross-braced structure. Normally, the belt furthermore has a belt ply designed as a blocking ply underneath the working plies, the path of the reinforcements of this belt ply being such as to enclose an angle of 45° to 70° with the circumferential direction. In addition, there is typically an additional protective ply formed radially above the two working plies as a fourth ply, the path of the reinforcements of said protective ply being such as to enclose an angle of 15° to 24° with the circumferential direction. The reinforcements of these belt plies are steel cords.

Pneumatic vehicle tires of this kind are normally produced in such a way that the belt plies are formed by parallel steel cords embedded in rubber, wherein the belt plies are built up on a building drum in order to produce the tire blank. The belt, with the tread added, is joined to the toroidal carcass. Once the complete tire blank is finished, the tire blank undergoes final shaping and vulcanizing in a vulcanizing press.

It is desirable that working plies with substantially inelastic reinforcements should be formed in the pneumatic vehicle tire. This provides a high circumferential stiffness to the belt, and this has a positive effect on the abrasion of the tire and on durability. To produce pneumatic vehicle tires of this kind, the working plies are laid on the building drum with substantially inelastic steel cords embedded in rubber. However, the lack of elasticity in the steel cords then counteracts the residual elevation of the tire in the vulcanizing press, which is important for final shaping. In the pneumatic vehicle tire produced, unwanted residual stresses resulting from the residual elevation may remain in the steel cord, between the steel cord and the rubber material and in the rubber material along the steel cord. In order to avoid disadvantages—such as the overloading of the rubber material—resulting from this or to compensate them in some other way, additional effort is required. When the pneumatic vehicle tires are designed in this way, therefore, the production of the pneumatic vehicle tires is made more difficult. Additional effort is required for final shaping or for compensation of residual stresses or an unwanted restriction of the design of the belt plies in respect of the use of inelastic steel cords. However, this reduces the achievable circumferential stiffness of the belt and limits the possibility of optimizing the abrasion of the tire.

SUMMARY OF THE INVENTION

It is an object of the invention to provide a simple way of enabling pneumatic vehicle tires with high durability and good abrasion properties to be produced efficiently.

According to the invention, the object is achieved by a method for producing a pneumatic vehicle tire with a belt, wherein at least one belt ply is formed by parallel steel cords embedded in rubber, wherein the belt ply is built up on a building drum in order to produce the tire blank, wherein, after the completion of the tire blank, the tire blank undergoes final shaping and vulcanizing in a vulcanizing press. A belt ply made of parallel elastic steel cords embedded in rubber is laid on the building drum in order to build up the belt. After the completion of the tire blank, the elasticity of the steel cords is modified to produce less elastic steel cords—in particular inelastic steel cords—during the final shaping and vulcanizing of the tire blank in a vulcanizing press.

This method makes it possible to retain conventional tire production, in which the belt plies are built up on a building drum and in which the finished tire blank, after the completion thereof, undergoes final shaping and vulcanizing in a vulcanizing press to give a residual elevation. At the same time, it is made possible for belt plies in which the steel cords have a low elasticity to be formed in finished pneumatic vehicle tires, thereby making possible a very high circumferential stiffness of the belt plies in the pneumatic vehicle tire. As a result, it is possible to form a pneumatic tire for commercial vehicles with working plies which have a high circumferential stiffness in the finished tire. Durability and abrasion can be set to very good levels. Building up the belt on the building drum with elastic steel cords enables the tire to undergo final shaping and vulcanizing substantially without stress without modifying the production method, without additional measures to allow residual elevation in the vulcanizing press and while using the desired conventional residual elevation in conventional vulcanizing presses. Unwanted residual stresses in steel cords in the belt plies, between the steel cords and the rubber material and in the rubber material surrounding the steel cords, along the steel cords, in the finished tire, can be avoided. It is thus possible in a simple manner to enable pneumatic vehicle tires to be produced with a high durability and good abrasion properties.

A method for making a pneumatic vehicle tire wherein a belt ply made of parallel open steel cords embedded in rubber is laid on the building drum in order to build up the belt is particularly advantageous. Open steel cords are steel cords in which the filaments of the steel cord do not have any direct contact with one another in the steel cord. As a result, the steel cord can be reinforced by being closed as the process progresses.

A method for making a pneumatic vehicle tire wherein, after the completion of the tire blank, the steel cords are closed further and—are in particular modified to produce closed steel cords—during the final shaping and vulcanizing of the tire blank in a vulcanizing press, are laid on, is particularly advantageous.

A method for making a pneumatic vehicle tire wherein a belt ply made of parallel steel cords embedded in rubber with a twist that can be modified via tensile forces and with a maximum length of twist of the steel cords of 10 mm is laid on the building drum in order to build up the belt is particularly advantageous. This makes it possible to increase the length of twist in the further production process and thereby to increase the stiffness of the steel cords in the belt.

A method for producing a pneumatic vehicle tire wherein, after the completion of the tire blank, the length of twist of the steel cords is increased during the shaping and vulcanizing of the tire blank in a vulcanizing press is particularly advantageous.

A method for producing a pneumatic vehicle tire for commercial vehicles, having a carcass, a belt built up radially to the outside of the carcass, and a profiled tread built up on the belt radially to the outside of the belt, is particularly advantageous. The belt is formed by a plurality of belt plies which are arranged one on top of the other radially from the inside to the outside and of which at least two belt plies are designed as working plies. The radially inner ply and the radially outer ply of the two working plies are belt plies which include parallel steel reinforcements embedded in rubber. The reinforcements of the radially inner working ply are aligned so as to enclose an angle α of $10°≤α≤24°$ with the circumferential direction U, and the reinforcements of the radially outer working ply are aligned so as to enclose an angle γ of $10°≤γ≤24°$ with the circumferential direction U. The reinforcements of one working ply have an opposite axial direction of inclination to the reinforcements of the other working ply, when viewed in the circumferential direction U of the vehicle tire. At least one—in particular both—working plies are laid on the building drum in order to build up the belt consisting of parallel elastic steel cords embedded in rubber. After the completion of the tire blank, the elasticity of the steel cords of the working ply (plies) is modified to produce less elastic steel cords—in particular inelastic steel cords—during the final shaping and vulcanizing of the tire blank in a vulcanizing press. It is thereby possible to reduce the stress in the rubber material around the steel cords but to increase the stiffness of the steel cords, even after vulcanizing. It is thereby possible to exert a further positive effect on the abrasion behavior of the tire.

A method for producing a pneumatic vehicle tire wherein a zero degree ply is built up between the two working plies is particularly advantageous.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
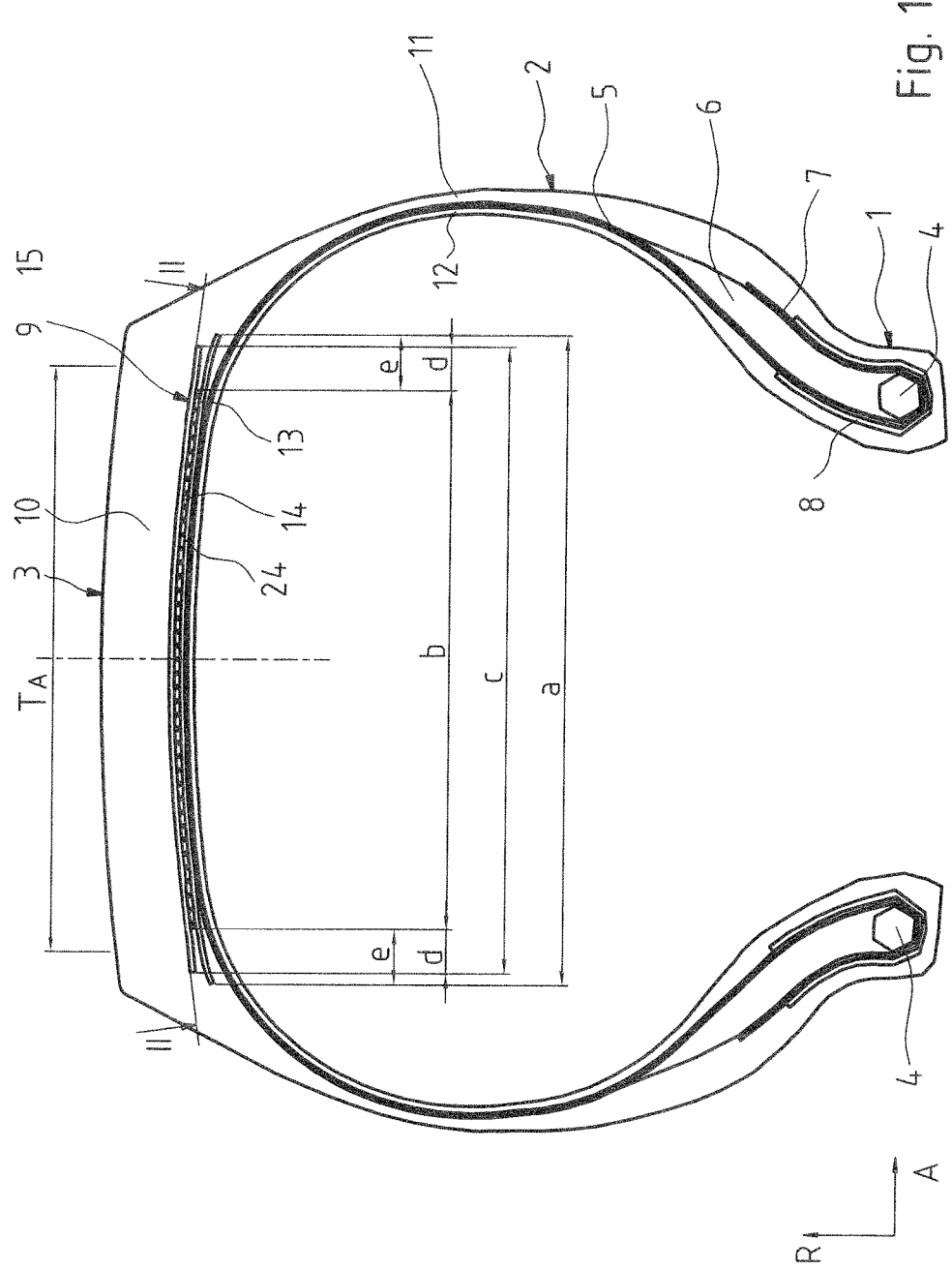
FIG. 1 shows the cross-sectional view of a pneumatic vehicle tire of radial construction for commercial vehicles.
Figure 2:
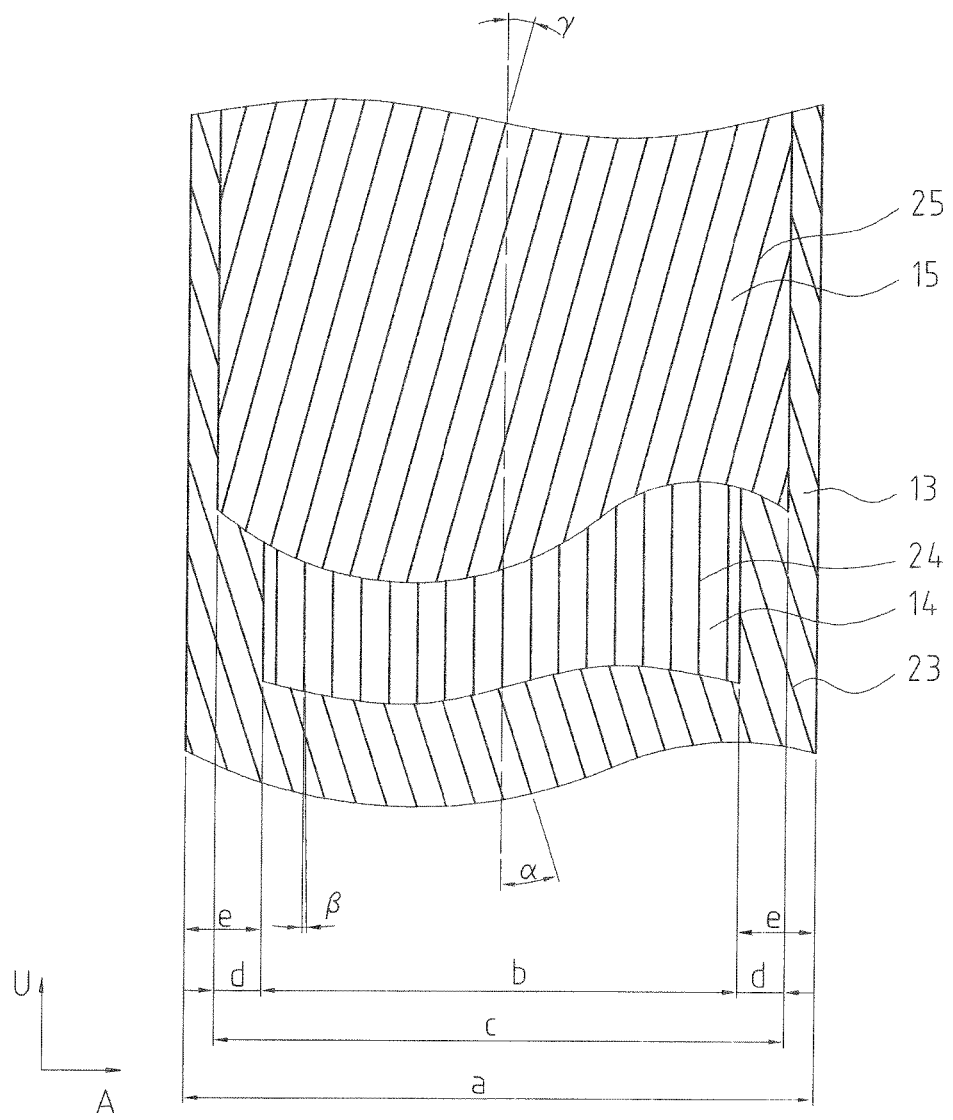
FIG. 2 shows a plan view of the belt of FIG. 1 in accordance with section II-II of FIG. 1, in which all the other components of the tire are not shown for the sake of simplicity.

FIGS. 1 and 2 show a pneumatic vehicle tire of radial construction for commercial vehicles, having two side walls 2 extending in the radial direction R of the vehicle tire and a crown region 3 formed axially between said walls. The side walls are each formed, at the end of the extension thereof which points inward in the radial direction, with a bead region 1, in which a bead core 4 resistant to tension in the circumferential direction U and extending over the circumference of the tire in the circumferential direction is formed. The bead cores 4 are formed by wound wire embedded in rubber extending in the circumferential direction U of the pneumatic vehicle tire. An apex (bead filler) 6 of triangular cross section and of hard rubber material is formed in a conventional manner on the bead cores 4. The pneumatic vehicle tire is formed with a carcass 5, which, starting from the bead core 4 formed in the left-hand bead region 1 of the pneumatic vehicle tire, extends outward in the radial direction R of the pneumatic vehicle tire, through the left-hand side wall 2, to the crown region 3 and, in the crown region 3, extends in the axial direction A of the pneumatic vehicle tire to the right-hand side wall 2 and, in the right-hand side wall 2 of the pneumatic vehicle tire, extends radially inward to the bead core 4 formed in the bead region 1 of the right-hand side wall 2. In both bead regions 1, the carcass is formed so as to extend in each case along the axial inside of the bead core 4 to the radial inside of the respective bead core 4, then, as an extension, in the axial direction along the radial inside of the bead core 4 to the axial outside of the bead core 4 and then, as an extension, radially outward on the axial outside of the bead core 4 as a turned-up part 7. The turned-up part 7 of the carcass 5 extends along the axial outside of the apex 6 and ends on the axial outside of apex 7. The carcass 5 is formed by a carcass ply extending over the entire circumference of the pneumatic vehicle tire in the circumferential direction U and including parallel cords—for example steel cords—embedded in rubber which extend substantially in the radial direction R in the region of the side walls 2 and substantially in the axial direction A in the crown region. An inner layer 12 of a rubber material that is particularly impermeable to air extends from the left-hand bead region 1 to the right-hand bead region 1 on the side of the carcass 5 which faces the inside of the tire. An additional bead reinforcing strip 8, which extends over the entire circumference of the pneumatic vehicle tire, is in each case formed in the bead region 1 on the side of the carcass 5 which faces away from the bead core 4. The bead reinforcing strip 8 is, for example, a strip of material consisting of parallel reinforcements of textile or metal construction embedded in rubber.

In the region of the tire crown 3, a belt 9 extending over the entire circumference of the pneumatic vehicle tire in the circumferential direction U and from the left-hand tire shoulder to the right-hand tire shoulder in the axial direction A is formed on the carcass 5 to the outside of the carcass 5 in the radial direction R of the pneumatic vehicle tire, the belt being formed by three belt plies 13, 14 and 15 arranged one above the other and one on top of the other in the radial direction R. A profiled tread 10 extending over the entire circumference of the pneumatic vehicle tire in the circumferential direction U and from the left-hand tire shoulder to the right-hand tire shoulder in the axial direction A is formed on the belt 9, radially to the outside of the belt 9, the tread completely covering the belt 9. A rubber side wall strip 11 is formed in the region of the tire side walls 2, on the side of the carcass 5 which faces axially away from the tire, said strip extending in the radial direction R from the bead region 1 to the profiled tread 10 in the crown region 3.

The radially inner belt ply 13 and the radially outer belt ply 15 are designed as working plies of the tire and each extend in the circumferential direction U over the entire circumference of the pneumatic vehicle tire and from the left-hand tire shoulder to the right-hand tire shoulder in the axial direction A. Working ply 13 is formed by a layer of parallel reinforcements 23 in the form of filaments embedded in rubber which extend substantially in a straight line over the entire width (a), measured in the axial direction A, of belt ply 13 and enclose an angle of inclination α of $10° \leq α \leq 24°$ with the circumferential direction U. Working ply 15 is formed by a layer of parallel reinforcements 25 in the form of filaments embedded in rubber which extend substantially in a straight line over the entire axial width (c) of belt ply 15 and enclose an angle of inclination γ of $10° \leq γ \leq 24°$ with the circumferential direction U. The direction of inclination of the reinforcements 25 of working plies 15, when viewed in the circumferential direction U, is formed in the opposite axial direction A to the direction of inclination of the reinforcements 23 of working ply 13. The third belt ply 14 formed between the two working plies 15 and 13 extends over the entire circumference of the pneumatic vehicle tire in the circumferential direction U and from the left-hand tire shoulder to the right-hand tire shoulder in the axial direction and is designed as a 0° ply. For this purpose, belt ply 14 is formed by parallel reinforcements in the form of filaments embedded in rubber which extend in a straight line over the entire circumference of the pneumatic vehicle tire, enclosing an angle β of $0° \leq β \leq 5°$ with the circumferential direction U, and are thus aligned substantially in the circumferential direction U of the pneumatic vehicle tire. All three belt plies 13, 14 and 15 extend on both axial sides into a position in the respective tire shoulder which is axially to the outside of the ground contact surface, indicated by the axial width $T_a$ of the ground contact surface. Belt ply 14 is in direct physical contact both with working ply 13 arranged underneath it and with working ply 15 arranged above it over its entire axial extent.

The 0° ply 14 extends over an axial width (b) in the axial direction A, the lower working ply 13 extends over an axial width (a) in the axial direction A, and the upper working ply 15 extends over an axial width (c) in the axial direction A in the tire, where a>c>b. In this arrangement, the inner working ply 13 extends beyond the axial position of the respective belt edge of the 0° ply 14 by an axial length of extension (e) on both axial sides of the 0° ply 14. The outer working ply 15 likewise extends beyond the axial position of the respective belt edge of the 0° ply 14, in each case by an axial length of extension (d), in both axial directions. The lengths of extension (e) and (d) of this overlap are governed by e>d. Here, the dimension (d) is given by d≥10 mm. In the illustrative embodiment, the dimension (e) is given by e≤60 mm. The two working plies 13 and 15 do not touch one another, even in the region of the overlap.

FIGS. 7A to 7D show the production of belt plies on a belt building drum 28 in a schematic sequence in FIGS. 7A and 7B, while FIG. 7C shows the combination of the fully built belt assembly 33—made of the various belt plies built up one on top of the other and the tread—with the toroidal carcass packet 32 produced independently thereof on a carcass building drum 30—made of the various carcass plies, the bead cores, the tire inner layer and the side parts—to give the tire blank 31, and FIG. 7D shows the final shaping and vulcanizing in a tire vulcanizing press 34.

FIGS. 7A and 7B show the production of the belt plies in the belt assembly 33 using belt ply 23 by way of example. For this purpose, a belt ply building material 13' produced in the form of a strip comprising parallel steel cords 23 embedded in the rubber and used to produce working ply 13 is fed continuously to a belt building drum 28, which is formed with a radially outer cylindrical or contoured building surface 29, concentrically with the axis of rotation of the belt building drum 28. During this process, the belt building drum 28 is driven in rotation about the axis of rotation thereof. As it does so, the belt ply building material 13' in strip form is pulled around the radially outer building surface 29 of the belt building drum 28 until it completely surrounds the circumference of the building surface 29. This state is illustrated in FIG. 7B. Following this, a belt ply building material 14' in strip form for producing belt ply 14 and including the parallel reinforcements 24 formed therein is likewise built up—in a manner not shown—on belt ply 13', which has already been built up, by rotating the belt building drum 28. In a similar way—not shown—a belt ply building material 15' produced in strip form and including the parallel reinforcements 25 embedded therein in the rubber is then built up around the belt building ply 14' formed in this way in order to produce working ply 15. Following this, a rubber tread material in strip form is then built up around the outer working ply 15 in order to produce the tread 10.

The reinforcements 23 of the belt ply building material 13' in strip form for building up working ply 13 and the reinforcements 25 of the belt ply building material 15' in strip form for building up working ply 15 are open steel cords which have a breaking load F of F>2500 N when subjected to a tensile load and have an elongation D of D 0.2% at 10% of the breaking load. Open steel cords are steel cords in which the filaments of the steel cord do not have any direct contact with one another in the steel cord. Steel cords of this kind are open steel cords of the type 3+8×0.35 LL %8 mm with a breaking load F=3100 N and with an elongation D of D=0.24% at 10% of the breaking load, for example.

A carcass packet 32 is produced in a conventional manner on a carcass building drum 30. For this purpose, the rubber material in strip form for producing the airtight inner layer of the tire is built up first on the radially outer surfaces of the carcass building drum 30, for example, followed by the carcass plies and, on the carcass plies, the bead cores with apex. To produce the toroidal shape, the bead cores are then moved toward one another in the axial direction of the carcass building drum 30, and the plies formed by the carcass plies and the inner layer are then expanded radially between the bead cores, and the carcass ply sections formed axially outside of the bead cores are folded up to form carcass turnups on the outside along the bead core and the apex. In addition, the rubber assembly strips forming the tire side walls are applied to the carcass plies. The carcass packet 32 is joined to the belt assembly 33 formed on the belt building drum 28 to give a tire blank 31. For this purpose, the belt assembly 33 is pushed onto the carcass packet 32 concentrically with the carcass packet 32, and joined to the latter. This state is shown in FIG. 7C.

The tire blank 31 produced in this way then undergoes shaping and vulcanizing in a tire vulcanizing press 34. For this purpose, the tire blank 31 is inserted into the tire vulcanizing press 34 formed by the two side shells 35 that perform final shaping on the tire side parts and by the tread molding segments 36 acting radially from the outside. The side shells 35 are moved axially into the target position thereof for final shaping of the tire side wall, and the tread molding segments 36 acting radially from the outside are moved into the target position thereof in the radial direction of the tire blank 31 for final shaping of the tread profile. The tire blank 31 is then raised slightly more from the inside, in the radial direction of the tire blank with the aid of hot steam and, if appropriate, with the aid of a heating bellows, thereby implementing the residual elevation, and, during this process, is pressed into the tread molding segments 36 in order to impart the final shape to the tread profile. During this residual elevation and under the action of heat and pressure, the steel cords 23 of working plies 13' and the steel cords 25 of working plies 15' are extended and, in the process, the cord structure thereof is closed, the cord type thereof being modified at the same time. During this process, the tire blank 31 is vulcanized under the action of pressure and temperature into the pneumatic vehicle tire. After the modification to the structure, the steel cords 23 and 25 are closed and, when subjected to a tensile load, have a breaking load F of F=3100 N and an elongation D of D≤0.2%, e.g. D=0.18%, measured in the tire, at 10% of the breaking load. A closed steel cord is a steel cord in which the outer and inner filaments are in point or linear contact with one another.

In another, alternative embodiment (not shown), the steel cords 23 and 25 used in the building plies 13' and 15' are steel cords of modifiable length of twist with a twist that can be modified by tension having a first length of twist. The first length of twist of the steel cords is designed to be a maximum of 10 mm.

During the residual elevation and vulcanizing in the vulcanizing press, the length of twist of these steel cords is increased owing to the tensile forces that are acting, and they then have a second length of twist higher than the first length of twist. The values are determined by means of the BISFA E6 standard test method for steel cords.

In one embodiment, the reinforcements 24 are steel cords. In another embodiment, the reinforcements 24 are steel cords which are configured as high-elongation cords (HE cords).

High-elongation cords of this kind have an elastic modulus which is lower at an elongation of between 0% and 2% than the elastic modulus thereof at an elongation of more than 2%.

In one illustrative embodiment, $\beta=1°$, $\alpha=20°$, $\gamma=20°$, $d=11$ mm and $e=15$ mm are chosen.

In an alternative embodiment (not shown) of the abovementioned embodiments, the angle of inclination $\alpha$ of the reinforcements 23 of the inner working ply 13 is in each case made larger than the angle of inclination $\gamma$ of the reinforcements 25 of the outer working ply 15.

In an alternative embodiment (not shown) of the abovementioned embodiments, the angle of inclination $\alpha$ of the reinforcements 23 of the inner working ply 13 is in each case made smaller than the angle of inclination $\gamma$ of the reinforcements 25 of the outer working ply 15.

Figure 3:
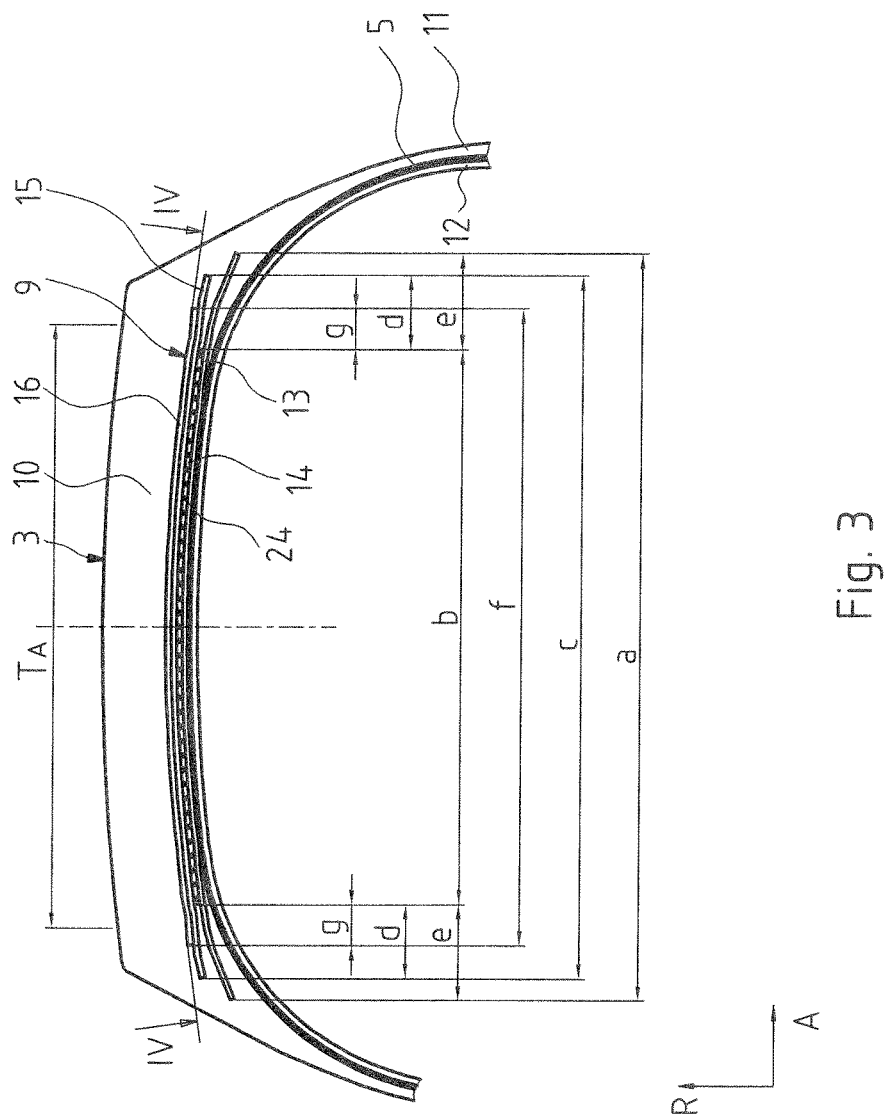
FIG. 3 shows a partial cross-sectional view of a pneumatic vehicle tire similar to the view of FIG. 1 with an alternative belt design.
Figure 4:
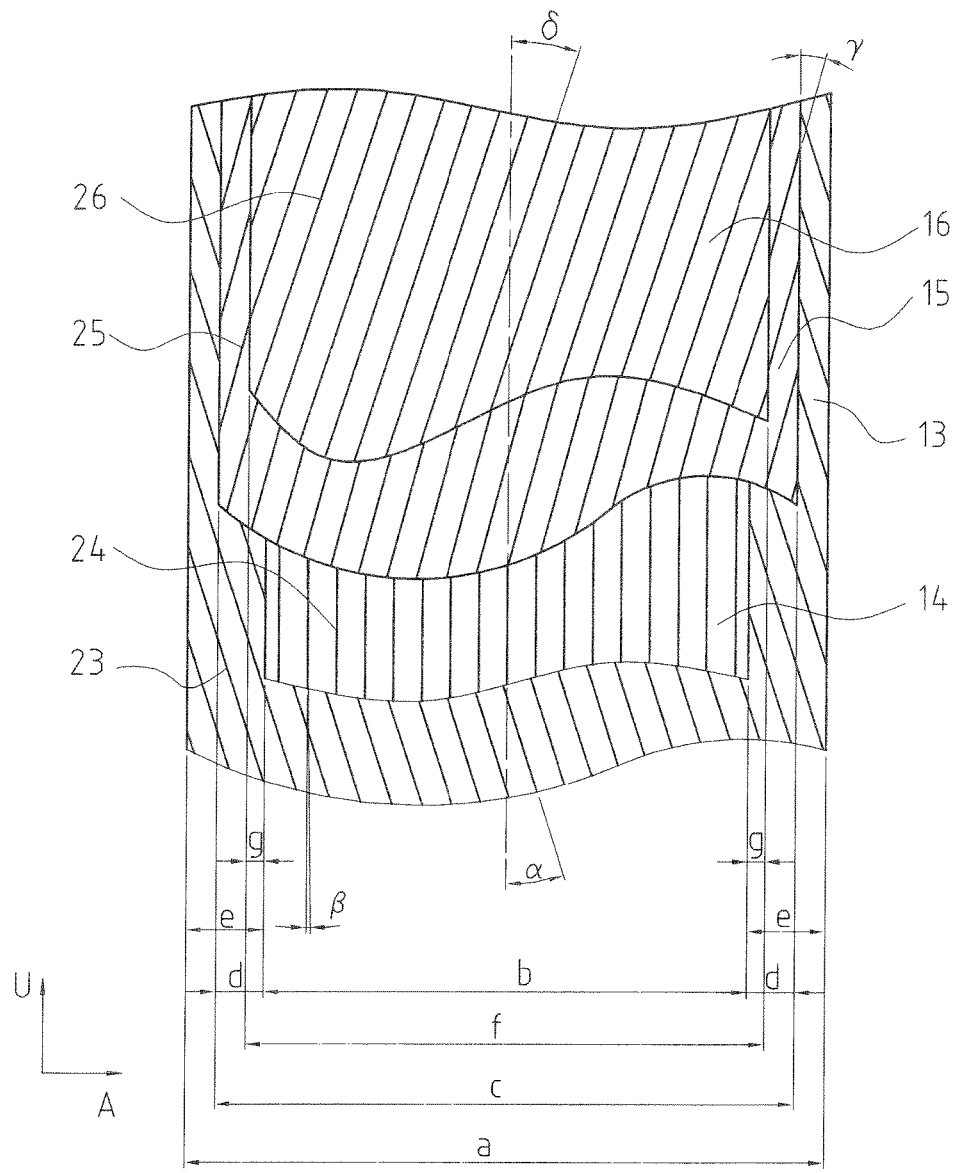
FIG. 4 shows a plan view of the belt of FIG. 3 in accordance with section IV-IV of FIG. 3, in which all the other components of the tire are not shown for the sake of simplicity.

FIGS. 3 and 4 show another alternative embodiment of the pneumatic vehicle tire, in which the belt 9 is formed with an additional belt ply 16 on the radial outer side of the outer working ply 15, in addition to the belt plies 13, 14 and 15 illustrated in FIGS. 1 and 2, the additional belt ply 16 extending over the entire circumference of the pneumatic vehicle tire in the circumferential direction U and from the left-hand tire shoulder to the right-hand tire shoulder in the axial direction A of the pneumatic vehicle tire. Belt ply 16 is formed by a layer of parallel reinforcements 26 in filament form embedded in rubber, which extend substantially in a straight line over the entire axial width (f) of belt ply 16 and enclose an angle of inclination $\delta$ of $15°\leq\delta\leq45°$ with the circumferential direction U. Belt ply 16 extends in direct physical contact with working ply 15 over its entire axial extent and ends in an axial position between the closest belt ply edge of the 0° ply 14 and the closest belt ply edge of the radially outer working ply 15 at both of its belt ply edges in the axial direction A, leaving an axial spacing (g) from the belt ply edge of the 0° ply 14 of g<d. The width (f) is the measure of the axial extent of the additional belt ply 16, where b<f<c<a.

In one illustrative embodiment, the reinforcements 26 of belt ply 16 are formed with the same angle of inclination as the reinforcements 25 of working ply 15.

The reinforcements 26 are steel cords.

In another embodiment (not shown), the additional belt ply 16 is designed as a 0° ply and the angle of inclination $\delta$ of the reinforcements 26 thereof, which extend over the entire circumference of the pneumatic vehicle tire, is $0°\leq\delta\leq5°$. In forming the additional working ply 16 as a 0° ply, the reinforcements 26 are steel cords of known type in one embodiment. In another embodiment, the reinforcements 26 of the working ply 16 designed as a 0° ply are steel cords which are configured as high-elongation cords (HE cords). High-elongation cords of this kind have an elastic modulus which is lower at an elongation of between 0% and 2% than the elastic modulus thereof at an elongation of more than 2%.

Figure 5:
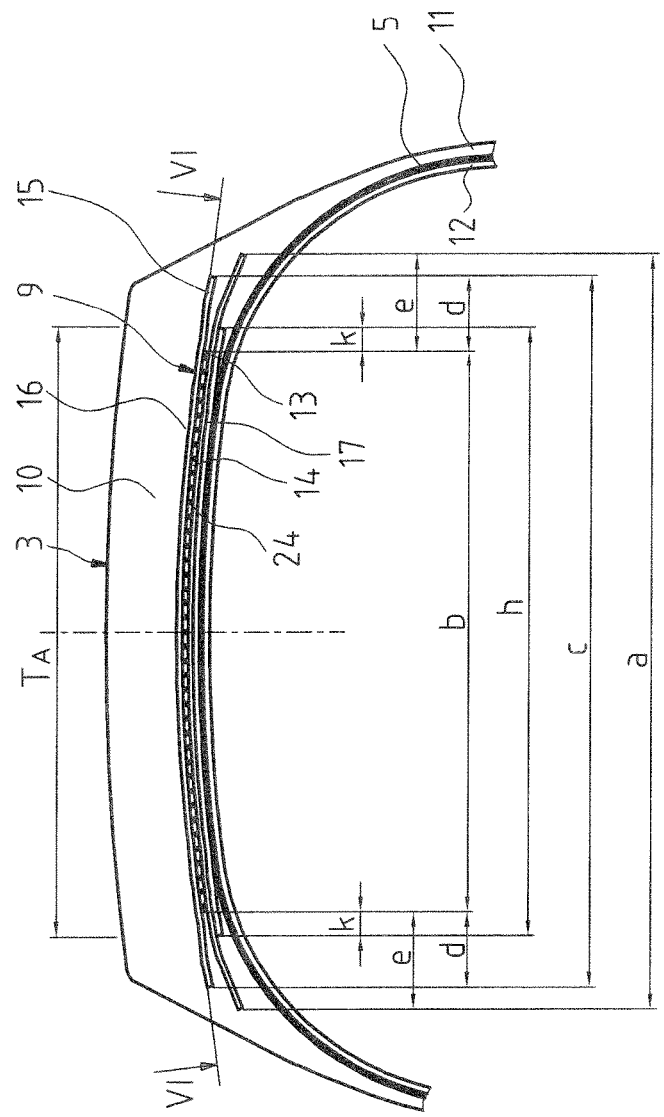
FIG. 5 shows a partial cross-sectional view of a pneumatic vehicle tire similar to the view of FIG. 1 with another alternative configuration of the belt.
Figure 6:
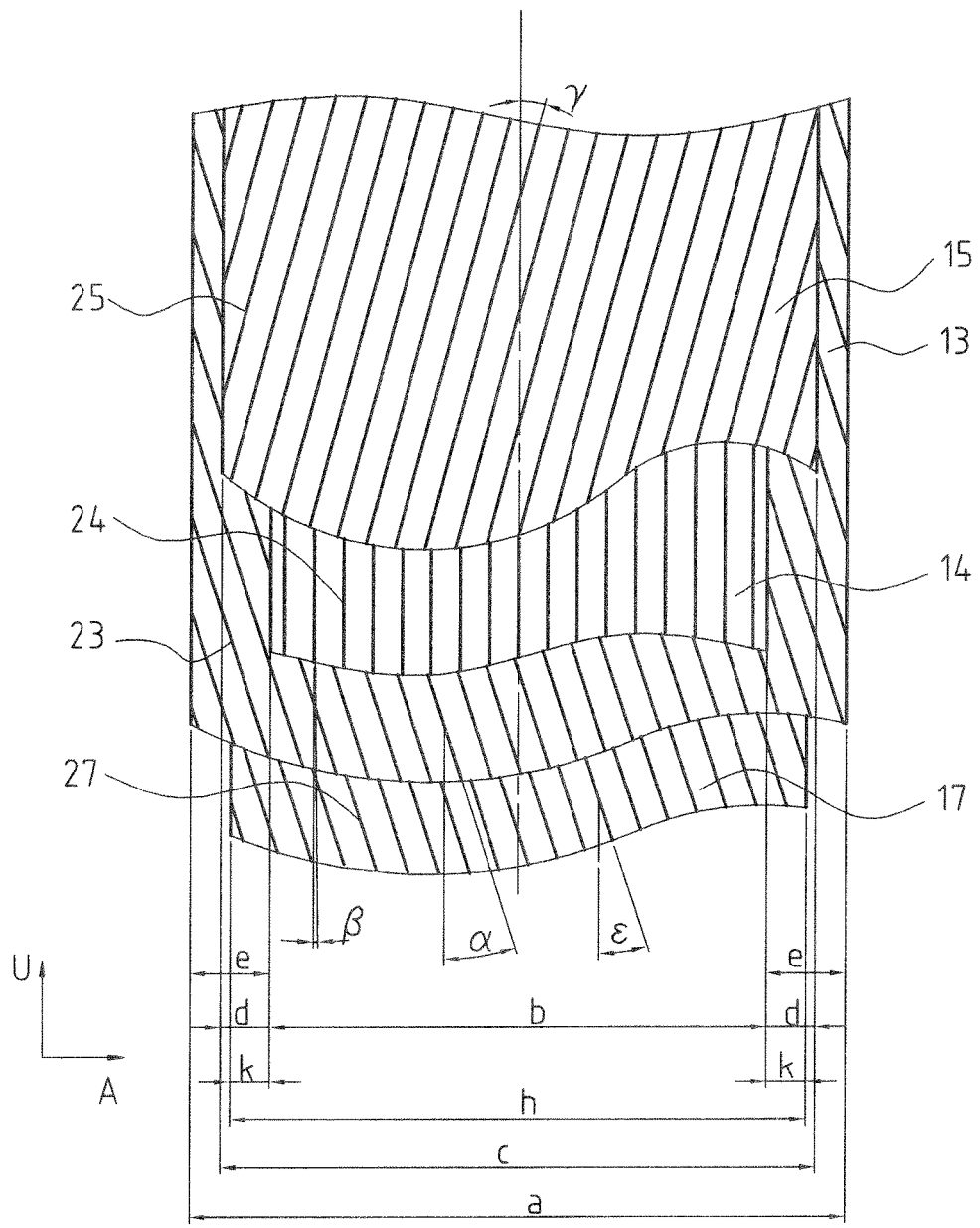
FIG. 6 shows a plan view of the belt in FIG. 5 in accordance with section VI-VI of FIG. 5, in which all the other components of the tire are not shown for the sake of simplicity; and, FIGS. 7A to 7D show a schematic view intended to show the production of the pneumatic vehicle tire in FIGS. 7A to 7D, which represent different method steps.

FIGS. 5 and 6 show another alternative illustrative embodiment of the pneumatic vehicle tire, in which, unlike in the illustrative embodiments shown in FIGS. 1 and 2 and described in relation to FIGS. 1 and 2, the belt 9 is additionally formed with a belt ply 17 arranged in a radial position between the radially inner working ply 13 and the carcass 5, the belt ply 17 extending over the entire circumference of the pneumatic vehicle tire in the circumferential direction U and from the left-hand tire shoulder to the right-hand tire shoulder in the axial direction A of the pneumatic vehicle tire. Belt ply 17 is formed by a layer of parallel reinforcements 27 in filament form embedded in rubber, which extend substantially in a straight line over the entire axial width (h) of belt ply 17 and enclose an angle of inclination $\epsilon$ of $45°\leq\epsilon\leq90°$, e.g. $\epsilon=50°$, with the circumferential direction U. Belt ply 17 extends in direct physical contact with working ply 13 over its entire axial extent and ends in an axial position between the closest belt ply edge of the 0° ply 14 and the closest belt ply edge of the radially outer working ply 15 at both of its belt ply edges in the axial direction A, leaving an axial spacing (k) from the belt ply edge of the 0° ply 14 of k<d<e. The width (h) is the measure of the axial extent of the additional belt ply 17, where b<h<c<a.

In one illustrative embodiment, the reinforcements 27 of belt ply 17 are formed with the same direction of inclination as the reinforcements 23 of the radially inner working ply 13.

The reinforcements 27 are steel cords.

In other alternative embodiments (not shown), the additional inner belt ply 17 illustrated in connection with FIGS. 5 and 6 is also formed in the embodiments with an additional belt ply 16 which is illustrated in connection with FIGS. 3 and 4. In this case, the belt 9 is formed by a 5-ply arrangement with the belt plies 17, 13, 14, 15 and 16 arranged one above the other, radially from the inside outward.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the description)
1 bead region
2 side wall
3 crown region
4 bead core
5 carcass
6 apex (bead filler)
7 carcass turnup
8 bead reinforcing strip
9 belt
10 profiled tread
11 rubber side wall strip
12 inner layer
13 belt ply (working ply)
14 belt ply (zero degree ply)
15 belt ply (working ply)
16 belt ply
17 belt ply
23 reinforcement
24 reinforcement
25 reinforcement
26 reinforcement
27 reinforcement
28 building drum
29 building surface
30 building drum
31 tire blank
32 carcass packet
33 belt assembly
34 vulcanizing press
35 side part
36 tread profiling segment

What is claimed is:

1. A method for making a vehicle tire for a utility vehicle, the vehicle tire including
   a carcass,
   a belt defining a circumferential direction U and being built up radially outside the carcass, and
   a profiled tread built up on the belt,
   the belt being made of a plurality of belt plies arranged lying one on top the other from a radially inner ply to a radially outer ply,
   the radially inner ply being a radially inner working ply and the radially outer ply being a radially outer working ply,
   the radially inner and radially outer working plies being belt plies having mutually parallel reinforcement steel cords having a pregiven elasticity embedded in rubber,
   the reinforcement steel cords of the radially inner working ply having an angle ($\alpha$) in the range of $10° \leq \alpha \leq 24°$ to the circumferential direction U, the reinforcement steel cords of the radially outer working ply having an angle ($\gamma$) in the range of $10° \leq \gamma \leq 24°$ to the circumferential direction U,
   the reinforcement steel cords of the radially inner working ply and the radially outer working ply having respective inclinations with respect to the circumferential direction U which are opposite to each other;
   the method comprising the steps of:
   applying the inner working ply and the outer working ply as open steel cords embedded in rubber to a building drum for building up the belt so that the belt becomes comprised of the radially inner ply as the radially innermost belt ply, an intermediate belt ply, and the radially outer working ply as the radially outermost belt ply and thereafter completing a tire blank which is an uncured assembly of the carcass, the belt, and the tread; and,
   after completion of the tire blank, shaping and vulcanizing the tire blank in a vulcanizing press while, at the same time, reducing the extensibility of the steel cords and closing the steel cords to form closed steel cords,
   wherein the open steel cord is of the type 3+8×0.35 LL 9/18 mm with a break load of F=3100 N and with an elongation D of D=0.24% at 10% of the breaking load.

* * * * *